(12) United States Patent
White

(10) Patent No.: US 12,618,454 B2
(45) Date of Patent: May 5, 2026

(54) CLAMPING DEVICE

(71) Applicant: GRIPPLE LIMITED, Sheffield (GB)

(72) Inventor: Samuel White, Sheffield (GB)

(73) Assignee: GRIPPLE LIMITED (GB)

( * ) Notice: Subject to any disclaimer, the term of this patent is extended or adjusted under 35 U.S.C. 154(b) by 129 days.

(21) Appl. No.: 18/683,163

(22) PCT Filed: Aug. 12, 2022

(86) PCT No.: PCT/IB2022/057539
§ 371 (c)(1),
(2) Date: Feb. 12, 2024

(87) PCT Pub. No.: WO2023/021384
PCT Pub. Date: Feb. 23, 2023

(65) Prior Publication Data
US 2024/0376961 A1      Nov. 14, 2024

(30) Foreign Application Priority Data

Aug. 18, 2021   (GB) ........................................ 2111811
Aug. 12, 2022   (GB) ..................................... 2211782

(51) Int. Cl.
*F16G 11/10*      (2006.01)
(52) U.S. Cl.
CPC .................................. *F16G 11/10* (2013.01)
(58) Field of Classification Search
CPC ........... F16G 11/10; F16G 11/106; F16B 2/14
See application file for complete search history.

(56) References Cited

U.S. PATENT DOCUMENTS

| | | | | |
|---|---|---|---|---|
| 1,692,993 | A | * | 11/1928 | Lambert ............... F16G 11/105 403/374.2 |
| 4,681,355 | A | | 7/1987 | Brammall et al. |
| 5,147,145 | A | * | 9/1992 | Facey ................... F16G 11/108 403/328 |
| 5,820,176 | A | * | 10/1998 | Leon ....................... F16G 11/14 292/323 |
| 6,003,210 | A | * | 12/1999 | Facey ................... F16G 11/106 24/130 |
| 6,058,574 | A | * | 5/2000 | Facey ................... F16G 11/106 24/115 R |
| 6,155,617 | A | | 12/2000 | Kuenzel |

(Continued)

FOREIGN PATENT DOCUMENTS

| | | |
|---|---|---|
| EP | 0386022 B1 | 4/1995 |
| GB | 2374896 A | 10/2002 |
| WO | 2016/079083 A1 | 5/2016 |

*Primary Examiner* — David M Upchurch
(74) *Attorney, Agent, or Firm* — Clark Hill PLC; James R. Foley

(57) ABSTRACT

A clamping device includes: a body defining opposite apertures to allow an elongate article to extend through the body, the body further defining a space between the apertures; a clamping member for clamping the elongate article; and an insert arrangement or overmoulded part received in the space. The insert arrangement or overmoulded part includes a holder defining a passage along which the elongate article can extend, wherein the holder includes a clamping formation, and the clamping member clamps the elongate article against the clamping formation in use.

20 Claims, 14 Drawing Sheets

(56)  References Cited

U.S. PATENT DOCUMENTS

| 6,345,847 B1 * | 2/2002 | Dreisbach | G09F 3/0358 |
| | | | 292/307 R |
| 6,719,335 B2 * | 4/2004 | Velschou | G09F 3/0352 |
| | | | 292/307 R |
| 7,243,963 B2 * | 7/2007 | De Lima Castro ... | G09F 3/0352 |
| | | | 292/307 R |
| 8,001,660 B2 * | 8/2011 | Cai | F16G 11/14 |
| | | | 292/307 R |
| 8,578,566 B2 * | 11/2013 | Jolly | F16G 11/14 |
| | | | 292/307 R |
| 9,188,193 B2 * | 11/2015 | Wilson | H02G 3/263 |
| 10,935,103 B2 * | 3/2021 | Moss | F16G 11/108 |
| 11,649,878 B2 * | 5/2023 | Fisher | F16G 11/108 |
| | | | 292/256 |
| 2003/0062460 A1 * | 4/2003 | Facey | F16G 11/14 |
| | | | 248/328 |
| 2003/0115723 A1 * | 6/2003 | Shuey | F16G 11/106 |
| | | | 24/136 R |
| 2006/0196016 A1 * | 9/2006 | Cai | F16G 11/106 |
| | | | 24/136 R |
| 2010/0279540 A1 * | 11/2010 | Shawcross | H01R 4/5083 |
| | | | 403/396 |
| 2020/0232489 A1 * | 7/2020 | Vaughn | F16B 2/14 |
| 2021/0257755 A1 * | 8/2021 | Jushchyshyn | H01R 4/5091 |

* cited by examiner

CLAMPING DEVICE

This application is a National Phase Filing of PCT/IB2022/057539, having an International filing date of Aug. 12, 2022, which claims priority of GB 2111811.2, filed Aug. 18, 2021, and GB 2211782.4, filed Aug. 12, 2022. The disclosure of the foregoing are hereby incorporated by reference.

This invention relates to clamping devices. More particularly, but not exclusively, this invention relates to clamping devices for clamping elongate articles.

In order to ensure that cable clamping devices meet the requirements of fire safety, many comprise bodies formed from a suitable fire resistant material, such as stainless steel, which can be costly. Wedges are often used to clamp cables. As a result of the clamping forces between the wedge and the body of the device, releasing the wedge can sometimes be difficult.

According to a first aspect of this invention, there is provided a clamping device comprising: a body defining opposite apertures to allow an elongate article to extend through the body, the body defining a space between the apertures; a clamping member for clamping the elongate article; and an insert arrangement received in the space; the insert arrangement comprising a holder defining a passage along which the elongate article can extend; wherein the holder includes a clamping formation, the clamping member clamping the elongate article against the clamping formation.

According to a second aspect of the invention, there is provided an insert arrangement for use in a clamping device, the insert arrangement comprising a holder defining a passage along which an elongate article can extend, the holder including a clamping formation, wherein a clamping member in the holder can clamp the elongate article against clamping formation.

The clamping member may comprise an elongate main portion having opposite ends. The clamping member may further include a clamping surface on the main portion, and a sliding surface on the main portion.

In a first clamping member, the sliding surface may taper inwardly towards one of said ends According to a third aspect of the invention, there is provided a clamping member for use in a clamping device, the clamping member comprising: an elongate main portion having opposite ends; a clamping surface on the main portion; and a sliding surface on the main portion, wherein the sliding surface tapers inwardly towards one of said ends.

The space defined by the body may be a compartment in the body. The passage may be aligned with the apertures. The clamping formation may comprise a clamping wall, which may extend along the passage.

The insert arrangement may be insertable into the space defined by the body. The insert arrangement may be removable from the space defined by the body.

The body may define a collecting formation in which debris formed by the insertion of the insert arrangement into the space defined by the body. The body may have opposite edge surfaces. The collecting formation may be defined adjacent one of the edge surfaces. The collecting formation may be a channel. The channel may extend along the edge surface.

The body may define two of the collecting formations. The collecting formations may be arranged opposite each other. Each of the collecting formations may be defined adjacent a respective one of the edge surfaces. Each of the collecting formations may be a respective channel. Each channel may extend along a respective one of the edge surfaces.

The clamping device may include a securing member to secure the insert arrangement in the body. The securing member may extend along the holder or the edge surface. The securing member may comprise a rib, such as a crush rib. The securing member may extend across one of the edge surfaces of the body.

The clamping device may comprise a plurality of the securing members. Each securing member may extend along the holder or the edge surface. Each securing member may comprise a rib, such as a crush rib. The securing members may extend across the edge surfaces of the body.

The insert arrangement may extend over the collecting formations when the insert arrangement is received in the space. The insertion arrangement may have outer walls. The outer walls may be disposed over the collecting formations to prevent material in the collecting formations being displaced therefrom. The outer walls may constitute sealing formations to seal said material in the collecting formations.

The above mentioned clamping formation may constitute a first clamping formation. The holder may comprise a second clamping formation for applying a clamping force to the clamping member. Thus, the clamping member and the elongate article are clamped between the first and second clamping formations.

The above mentioned clamping wall may constitute a first clamping wall. The second clamping formation may comprise a second clamping wall.

The first and second clamping formations may converge towards each other. The first and second clamping formations may provide a narrowing gap between the first and second clamping formations.

The passage may have an entrance end through which the elongate article can enter the passage when the elongate article is introduced into the passage. The passage may have an exit end through which the elongate article can exit the passage after the elongate article has been introduced into the passage.

The holder may define opposite openings for the passage through which the elongate article can extend. One of the opposite openings may be an entrance opening at the entrance end of the passage. The other of the opposite openings may be an exit opening at the exit end of the passage. The exit opening may be wider than the entrance opening.

The clamping device may comprise an urging member for urging the clamping member. The urging member may urge the clamping member into clamping engagement with the elongate article.

The urging member may urge the clamping member towards the entrance end of the passage. The urging member may urge the clamping member into the narrowing gap between the first and second clamping formations.

The urging member may comprise a resilient urging member. The urging member may comprise a spring, such as a coil spring. The urging member may be a compression spring. It will be appreciated that the urging member could be any other suitable urging member.

The opposite ends of the clamping member may be opposite first and second ends. In use, the clamping member may be urged into engagement with the elongate article in a direction in which the first end leads the second end.

The sliding surface may taper inwardly from the first end to the second end. The tapering of the sliding surface may be a uniform taper from said first end to said second end.

Alternatively, the sliding surface may taper inwardly from the second end to the first end. The tapering of the sliding surface may be a uniform taper from said second end to said first end The holder may comprise a cover member to provide a cover across the space defined by the body. The cover member may extend between the first and second clamping formations The insert arrangement may comprise two of the holders. The clamping device may comprise two of the clamping members. A respective one of the clamping members may be provided for each of the holders.

The clamping device may further include two of the urging members. A respective one of the urging members may be provided for each of the holders.

Each of the holders may define a respective passage. Each of the holders may have the features of the first mentioned holder described above.

Where the insert arrangement comprises two of the holders, the passage defined by each holder may receive therethrough a respective elongate article, or a respective pass of the same elongate article.

The insert arrangement may have opposite ends. The entrance end of each of the passages may be at the opposite end of the insert arrangement to the entrance end of the other of the passages.

The insert arrangement may comprise a connecting portion to connect the holders to each other. The connecting portion may extend from the first clamping formation of one of the holders to the first clamping formation of the other of the holders. In one embodiment, the connecting portion may comprise a web of material extending between the holders.

The body may have two pairs of opposite apertures. One pair of the opposite apertures may be aligned with the passage defined by one of the holders. The other pair of the opposite apertures may be aligned with the passage defined by the other of the holders.

The clamping device may include a reaction formation for applying a reaction force to the urging member. The reaction formation may extend partially across one end of the passage. The reaction formation may extend partially across the exit end of the passage.

The reaction formation may comprise a reaction wall. The body may comprise the reaction formation.

The body may include a chamber, which may be provided at an end of the body. The reaction formation may be a reaction wall of the chamber.

The urging member may extend from the chamber into the holder via the exit opening.

Where the insert arrangement has two of the holders, the clamping device may have two of the reaction formations. The body may comprise both of the reaction formations. Each reaction formation may extend partially across the exit end of the respective passage.

The body may have two of the chambers. Each chamber may be provided at a respective opposite end of the body. Each reaction formation may be a reaction wall of the respective chamber.

Each urging member may extend from the respective chamber into the respective holder via the exit opening.

The body of the clamping device may comprise a central part in which the space is defined. The central part may comprise the reaction formation. Where the insert arrangement has two of the holders, the central part may comprise both of the reaction formations.

The body may comprise a cap portion which may be attached to the central part over one of the apertures. The cap portion may comprise an end cap portion.

The cap portion may be attached to the central part over the entrance opening of the passage. The cap portion may define one of the opposite apertures. Said one of the opposite apertures may be aligned with the entrance opening of the passage. Said one of the opposite apertures may constitute an entrance aperture.

The body may define a further cap portion to be attached to the central part over the other of the apertures. The further cap portion may comprise a further end cap portion.

The further cap portion may be attached to the central part over the exit opening of the passage. The further cap portion may define the other of the opposite apertures. Said other of the opposite apertures may be aligned with the exit opening of the passage. Said other of the opposite apertures may constitute an exit aperture.

Where the insert arrangement has two of the holders, the cap portion may have an entrance aperture and an exit aperture. The cap portion may be attached to the central part over the entrance opening of one of the passages and over the exit opening of the other of the passages.

The further cap portion may have an entrance aperture and an exit aperture. Each cap portion may be attached to respective opposite ends of the central part over the entrance opening of one of the passages and over the exit opening of the other of the passages.

The entrance aperture of each of the cap portions may be aligned with the entrance opening of a respective passage. The exit aperture of each of the cap portions may be aligned with the exit opening of the respective passage.

The body may comprise opposite partitions extending across the space defined between the opposite apertures. One of the partitions may define an entrance hole aligned with the entrance opening of the holder. The other of the partitions may define an exit hole aligned with the exit opening of the holder.

Where the insert arrangement comprises two of the holders, each of the partitions may define an entrance hole aligned with the entrance opening of one of the holders, and each partition may define an exit hole aligned with the exit opening of the other of the holders.

The, or each, cap portion may have cooperating fastening formations to cooperate with corresponding formations on the central part. The cooperating formations and the corresponding formations may comprise snap fit formations.

The insert arrangement may be formed of a fire resistant material. Examples of such fire resistant materials are stainless steel for the holder and a ceramic material for the clamping member. The body may be formed of a material that is less fire resistant than the material from which the insert arrangement is formed. For example, the body may be formed of zinc or a plastics material.

The use of different materials to form the insert arrangement and the body reduces manufacturing costs. In the event of a fire, the body can be destroyed, but the insert arrangement, which clamps the elongate articles, remains intact.

The clamping member may comprise an elongate clamping member. The clamping member may comprise a clamping wedge.

In a first clamping member, the sliding surface may taper inwardly from the first end to the second end. The tapering of the sliding surface may be a uniform taper between said first and second ends.

The sliding surface may be provided on the main portion opposite the clamping surface.

The sliding surface has a length and a width, wherein the width of the sliding surface may reduce from the first end to the second end. The width of the sliding surface at the second end may be substantially half the width of the sliding surface at the first end.

Alternatively, the sliding surface may taper inwardly from the second end to the first end. In this alternative, the width of the sliding surface may reduce from the second end to the first end. The width of the sliding surface at the first end may be substantially half the width of the sliding surface at the second end.

The main portion may have a leading end and a trailing end. The first end may be the leading end of the main portion. The second end may be a trailing end of the main portion.

The clamping member may include a side portion protruding from the main portion. The side portion may be provided between the clamping surface and the sliding surface.

The main portion may include two opposite side portions protruding from the main portion. The side portions may be provided between the clamping surface and the sliding surface.

The clamping surface has a length and a width, wherein the width of the clamping surface may be substantially uniform along the length of the clamping surface.

The clamping surface may be serrated. The clamping surface may project from the main portion. The clamping surface has a length and a width, wherein the width of the clamping surface may be substantially uniform along the length of the main portion.

The main portion has a height and may reduce in height from the trailing end to the leading end.

The, or each, side portion may protrude widthways beyond the sliding surface. The, or each, side portion may protrude widthways beyond the sliding surface.

The clamping surface may be engageable with the elongate article. The sliding surface may be engageable with a wall of the clamping device, to allow sliding movement of the clamping member along said wall.

In a second clamping member, the sliding surface may have a step formation. The clamping surface may engage the elongate article to clamp the elongate article against a first clamping surface of a clamping device. The step formation may cooperate with a shoulder formation on the second clamping surface formation of the clamping device.

The step formation may be elongate. The main portion may have a length. The main portion may be elongate. The step formation may extend lengthwise of the main portion. The step formation may extend the whole length of the main portion.

The sliding surface may have a length. The sliding surface may be elongate. The step formation may extend lengthwise of the sliding surface. The step formation may extend the whole length of the sliding surface.

The sliding surface may be opposite the clamping surface.

The sliding surface may comprise first and second sliding faces. The first and second sliding faces may be elongate.

The first and second sliding faces may be spaced from each other. The first and second sliding faces may occupy separate planes. The step formation may extend between the first and second sliding faces.

The first sliding face may be a projecting face of the sliding surface. The second sliding face may be a recessed face of the sliding surface.

The first sliding face may extend lengthwise of the main portion. The first sliding face may extend the whole length of the main portion. The first sliding face may extend lengthwise of the sliding surface. The first sliding face may extend the whole length of the sliding surface.

The second sliding face may extend lengthwise of the main portion. The second sliding face may extend the whole length of the main portion. The second sliding face may extend lengthwise of the sliding surface. The second sliding face may extend the whole length of the sliding surface.

The step formation may extend lengthwise of the main portion. The step formation may extend the whole length of the main portion. The step formation may extend lengthwise of the sliding surface. The step formation may extend the whole length of the sliding surface.

The second clamping formation may comprise a shoulder formation for cooperating with the first mentioned step formation of the clamping member.

The second clamping formation may be elongate. The second clamping formation may have a length. The shoulder formation may extend lengthwise of the second clamping formation. The shoulder formation may extend the whole length of the second clamping formation.

The second clamping formation may comprise first and second engaging faces. The first and second engaging faces may be elongate. The first and second engaging faces may be spaced from each other. The first and second engaging faces may occupy separate planes. The shoulder formation may extend between the first and second engaging faces.

The first engaging face may comprise projecting face of the second clamping formation. The second engaging face may comprise a recessed face of the second clamping formation.

The first engaging face may extend lengthwise of the second clamping formation. The first engaging face may extend the whole length of the second clamping formation.

The second engaging face may extend lengthwise of the second clamping formation. The second engaging face may extend the whole length of the second clamping formation.

When the sliding surface cooperates with the second clamping formation, the first sliding face of the sliding surface may engage the second engaging face of the second clamping formation. The second sliding face of the sliding surface may engage the first engaging face of the second clamping formation.

The second sliding face may have dimensions that prevent the step formation engaging the shoulder formation. The step formation may extend at an obtuse angle to the second sliding face. Thus, with the embodiment described herein, the surface area of the sliding surface in engagement with the engagement formation is less than if the sliding surface and the second clamping formation did not possess the step formation and the shoulder formation.

According to a fourth aspect of the invention, there is provided a clamping member for use in a clamping device, the clamping member comprising: an elongate main portion having opposite first and second ends; a clamping surface and a sliding surface, both of the clamping surface and the sliding surface being on the main portion, wherein the sliding surface has a step formation.

The clamping surface may engage the elongate article to clamp the elongate article against a first clamping surface of a clamping device. The step formation may cooperate with a shoulder formation on a second clamping surface formation of the clamping device.

The clamping member is suitable for clamping an elongate article, such as the elongate article described above.

According to a fifth aspect of this invention, there is provided a clamping device comprising: a body; a passage defined in the body; the body defining opposite apertures to allow an elongate article to extend through the passage; a clamping member as described in the immediately preceding paragraph for clamping the elongate article; a clamping formation and an engaging formation extending along the passage, whereby the elongate article and the clamping member can be clamped between clamping formation and the engaging formation; the sliding surface of the clamping member having a step formation, and the engaging formation having a shoulder formation to cooperate with the step formation of the sliding surface, thereby allowing the clamping member to slide along the engaging wall.

The step formation may be elongate. The main portion may have a length. The main portion may be elongate. The step formation may extend lengthwise of the main portion. The step formation may extend the whole length of the main portion.

The sliding surface may have a length. The sliding surface may be elongate. The step formation may extend lengthwise of the sliding surface. The step formation may extend the whole length of the sliding surface.

The sliding surface may be opposite the clamping surface.

The sliding surface may comprise first and second sliding faces. The first and second sliding faces may be elongate.

The first and second sliding faces may be spaced from each other. The first and second sliding faces may occupy separate planes. The step formation may extend between the first and second sliding faces.

The first sliding face may be a projecting face of the sliding surface. The second sliding face may be a recessed face of the sliding surface.

The first sliding face may extend lengthwise of the main portion. The first sliding face may extend the whole length of the main portion. The first sliding face may extend lengthwise of the sliding surface. The first sliding face may extend the whole length of the sliding surface.

The second sliding face may extend lengthwise of the main portion. The second sliding face may extend the whole length of the main portion. The second sliding face may extend lengthwise of the sliding surface. The second sliding face may extend the whole length of the sliding surface.

The step formation may extend lengthwise of the main portion. The step formation may extend the whole length of the main portion. The step formation may extend lengthwise of the sliding surface. The step formation may extend the whole length of the sliding surface.

The clamping member may be used in a clamping device, in which the engaging formation is a formation of the clamping device. The engaging formation may comprise a wall of the clamping device. The clamping device may comprise first and second clamping formations, whereby the clamping member and the elongate article are clamped between the first and second clamping formations.

The engaging formation may comprise a shoulder formation for cooperating with the first mentioned step formation of the clamping member.

The engaging formation may be elongate. The engaging formation may have a length. The shoulder formation may extend lengthwise of the engaging formation. The shoulder formation may extend the whole length of the engaging formation.

The engaging formation may comprise first and second engaging faces. The first and second engaging faces may be elongate. The first and second engaging faces may be spaced from each other. The first and second engaging faces may occupy separate planes. The shoulder formation may extend between the first and second engaging faces.

The first engaging face may comprise projecting face of the engaging formation. The second engaging face may comprise a recessed face of the engaging formation.

The first engaging face may extend lengthwise of the engaging formation. The first engaging face may extend the whole length of the engaging formation.

The second engaging face may extend lengthwise of the engaging formation. The second engaging face may extend the whole length of the engaging formation.

When the sliding surface cooperates with the engaging formation, the first sliding face of the sliding surface may engage the second engaging face of the engaging formation. The second sliding face of the sliding surface may engage the first engaging face of the engaging formation.

The second sliding face may have dimensions that prevent the step formation engaging the shoulder formation. The step formation may extend at an obtuse angle to the second sliding face. Thus, with the embodiment described herein, the surface area of the sliding surface in engagement with the engagement formation is less than if the sliding surface and the engaging formation did not possess the step formation and the shoulder formation.

The clamping device of the fifth aspect of the invention may include the insert arrangement described above. The engaging formation may be a formation of the insert arrangement. The engaging formation may be the second clamping formation described above. The engaging formation may comprise the second clamping wall of the insert arrangement The body may define a space between the apertures. The insert arrangement may be received in the space. The insert arrangement may comprise the holder defining the passage along which the elongate article can extend. The holder may include the engaging formation. The holder may define the passage.

The engaging formation may constitute the second clamping formation described above. The engaging formation may constitute the aforesaid second clamping wall.

The insert arrangement may comprise the features of the insert arrangement described above in connection with the first, second and third aspects of the invention.

Where the insert arrangement comprises two of the holders, each holder may comprise a respective one of said engaging formations. The clamping device may comprise two clamping members. Each clamping member may be received in a respective one of the passages.

The engaging formation of each holder may comprise a respective shoulder formation to cooperate with the step formation of the sliding surface of a respective one of the clamping members.

The clamping device of the fifth aspect of the invention may comprise an urging member for urging the clamping member. The urging member may urge the clamping member into clamping engagement with the elongate article.

The urging member may urge the clamping member towards the entrance end of the passage. The urging member may urge the clamping member into the narrowing gap between the first and second clamping formations.

The urging member may comprise a resilient urging member. The urging member may comprise a spring, such as a coil spring. The urging member may be a compression spring. It will be appreciated that the urging member could be any other suitable urging member. The urging member may have the features of the urging member described above in connection with the first to third aspects of the invention.

The body of the fifth aspect of the invention may include the end cap portions described above. The body of the fifth aspect of the invention may include the, or each, reaction formation for applying a reaction force to the urging member. The body of the fifth aspect of the invention may include the, or each, chamber described above, which may comprise the, or each, reaction formation.

According to a further aspect of the invention there is provided a clamping device comprising: a body defining opposite apertures to allow an elongate article to extend through the body, the body defining a space between the apertures; a clamping member for clamping the elongate article; and a holder in the space; the holder defining a passage along which the elongate article can extend; wherein the holder includes a clamping formation, the clamping member clamping the elongate article against the clamping formation, wherein the holder is formed of a different material than the body.

At least one embodiment of the invention will now be described by way of example only, with reference to the accompanying drawings, in which.

Figures 1, 2:
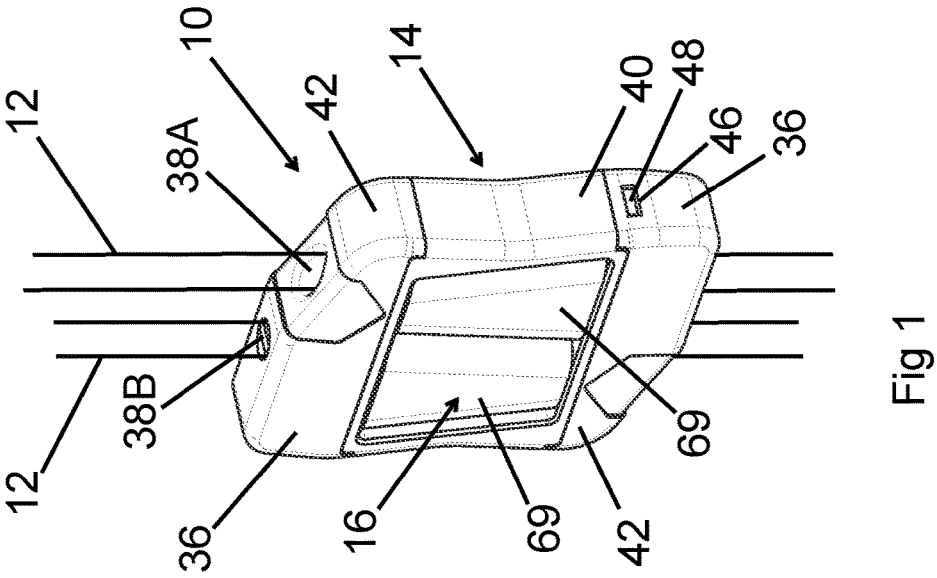
FIG. 1 is a perspective view of a clamping device.
FIG. 2 is an exploded view of the clamping device.
Figure 3:
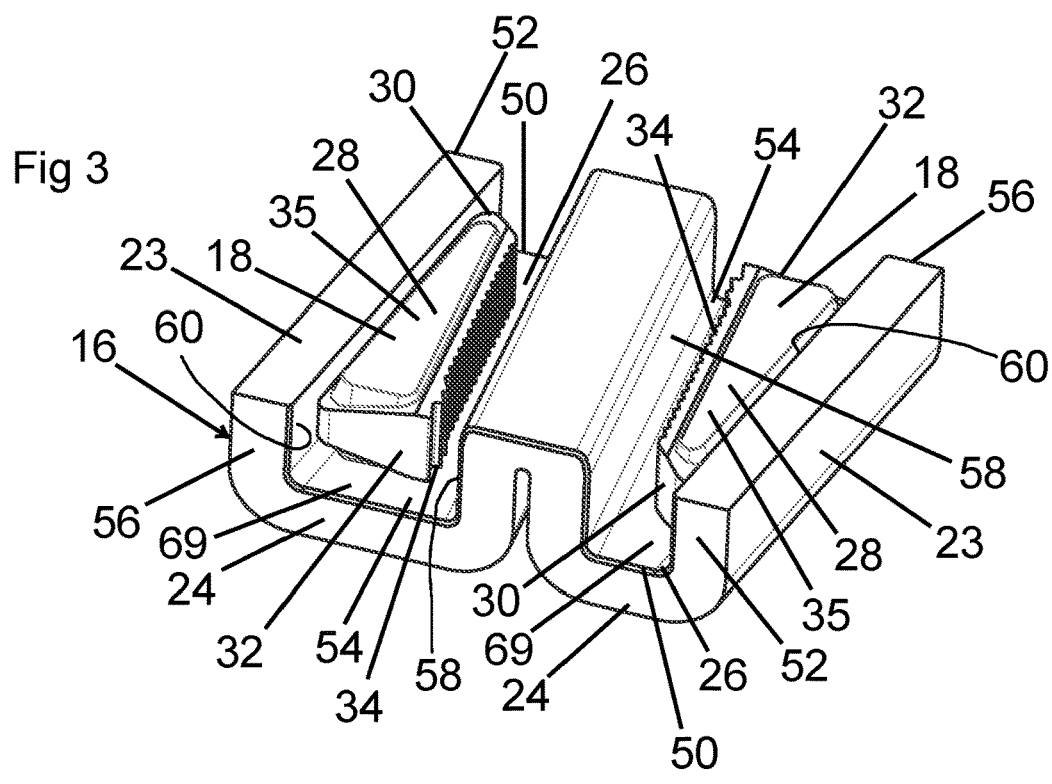
FIG. 3 is a perspective view of an insert arrangement and two clamping members.

FIGS. 1 to 9 show a clamping device 10 for clamping an elongate article 12 (shown in broken lines in FIG. 1). The elongate article 12 may be in the form of a wire, wire rope, cable, or the like. The clamping device 10 comprises a body 14, an insert arrangement 16 and two clamping members 18.

The body 14 defines a compartment 20 having an inner surface defining a space 22. The inner surface comprises a base surface 82 and opposite edge surfaces 84. The insert arrangement 16 is inserted into the compartment 20 during assembly. When so inserted, the insert arrangement 16 engages the base surface 82 and the opposite edge surfaces 84.

The insert arrangement 16 has two outer walls 23, and two holders 24 defined between the outer walls 23. The holders 24 hold the clamping members 18. Each holder 24 defines a passage 26 along which the elongate articles 12 can extend. A respective one of the clamping members 18 is held in the passage 26 of each holder 24.

Each clamping member 18 is in the form of a wedge comprising a main portion 28 having a leading end 30, a trailing end 32 and a clamping surface 34 extending therebetween. The clamping surface 34 projects from the main portion 28, and has serrations to provide tight engagement with the elongate article 12.

Figure 20:
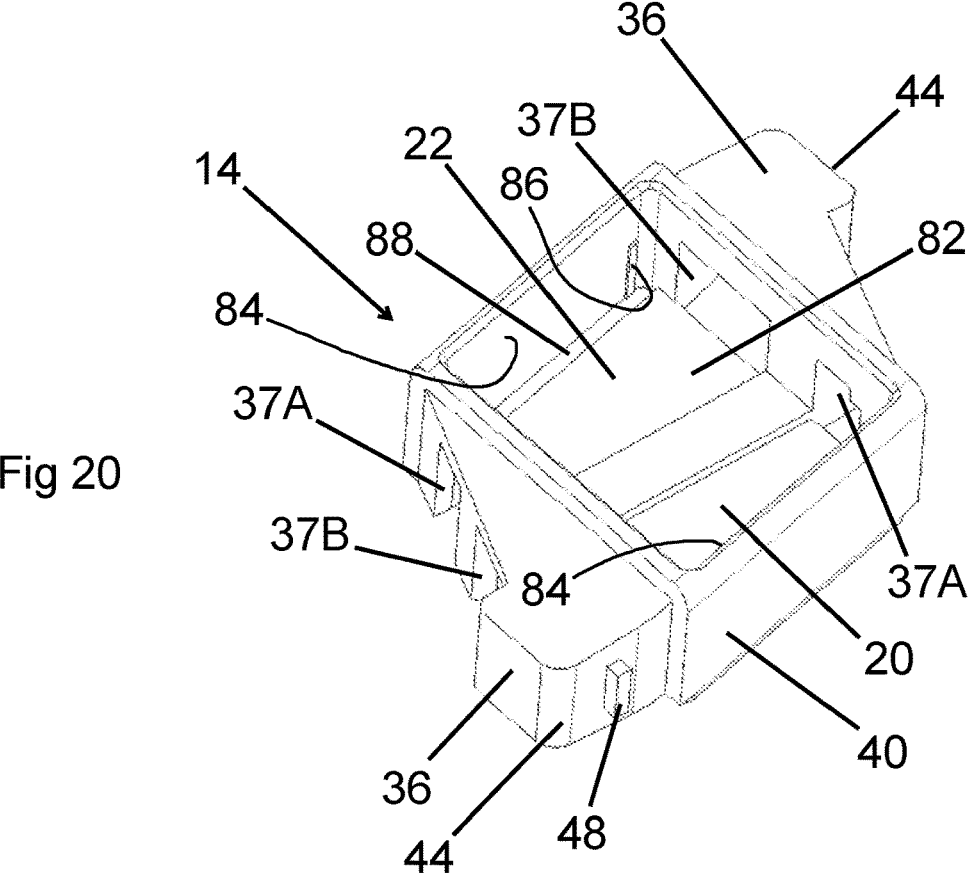
FIG. 20 is a perspective view of the body shown in FIG. 19.
Figure 21:
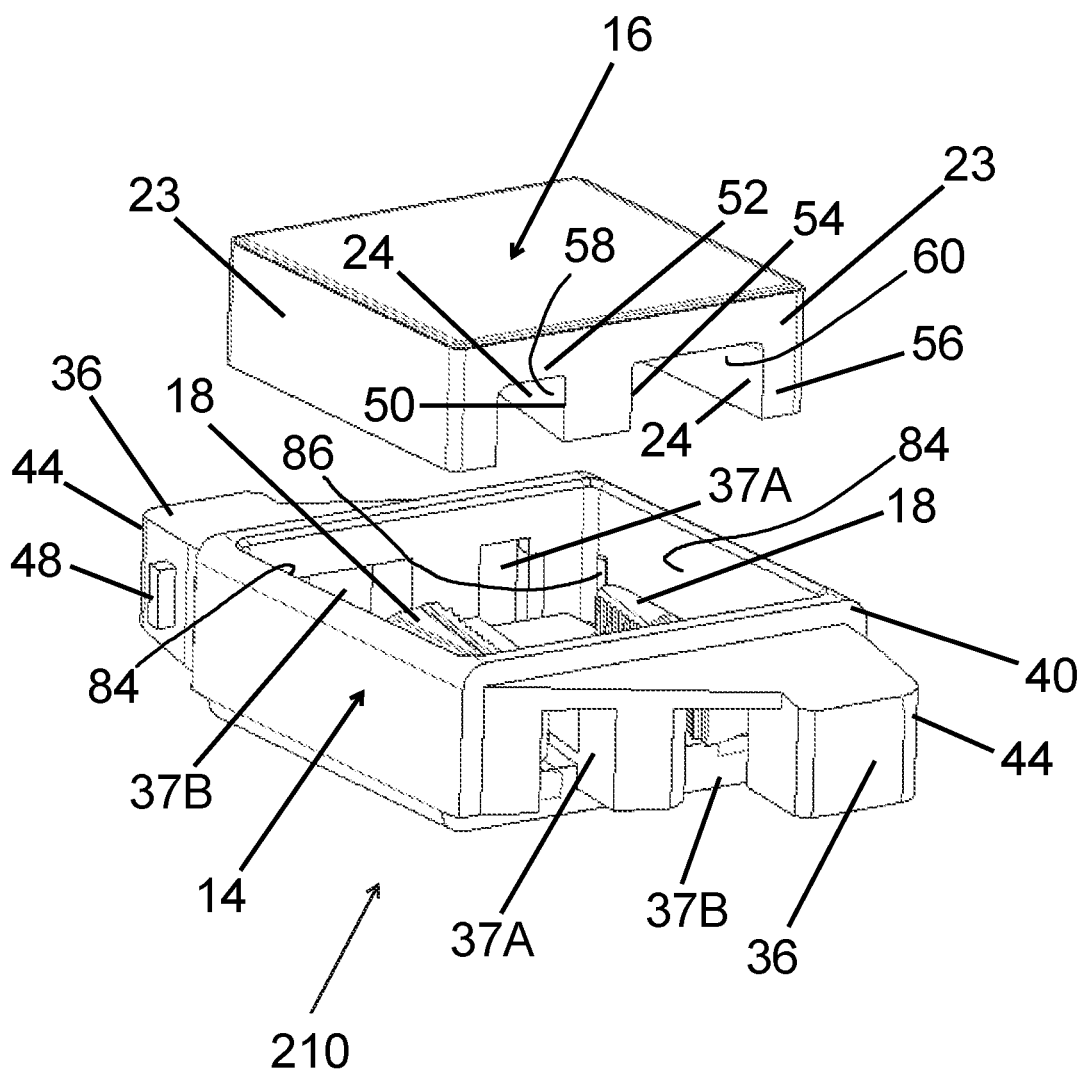
FIG. 21 is an exploded perspective view of components of the modified clamping device shown in FIGS. 19 and 20.
Figure 22:
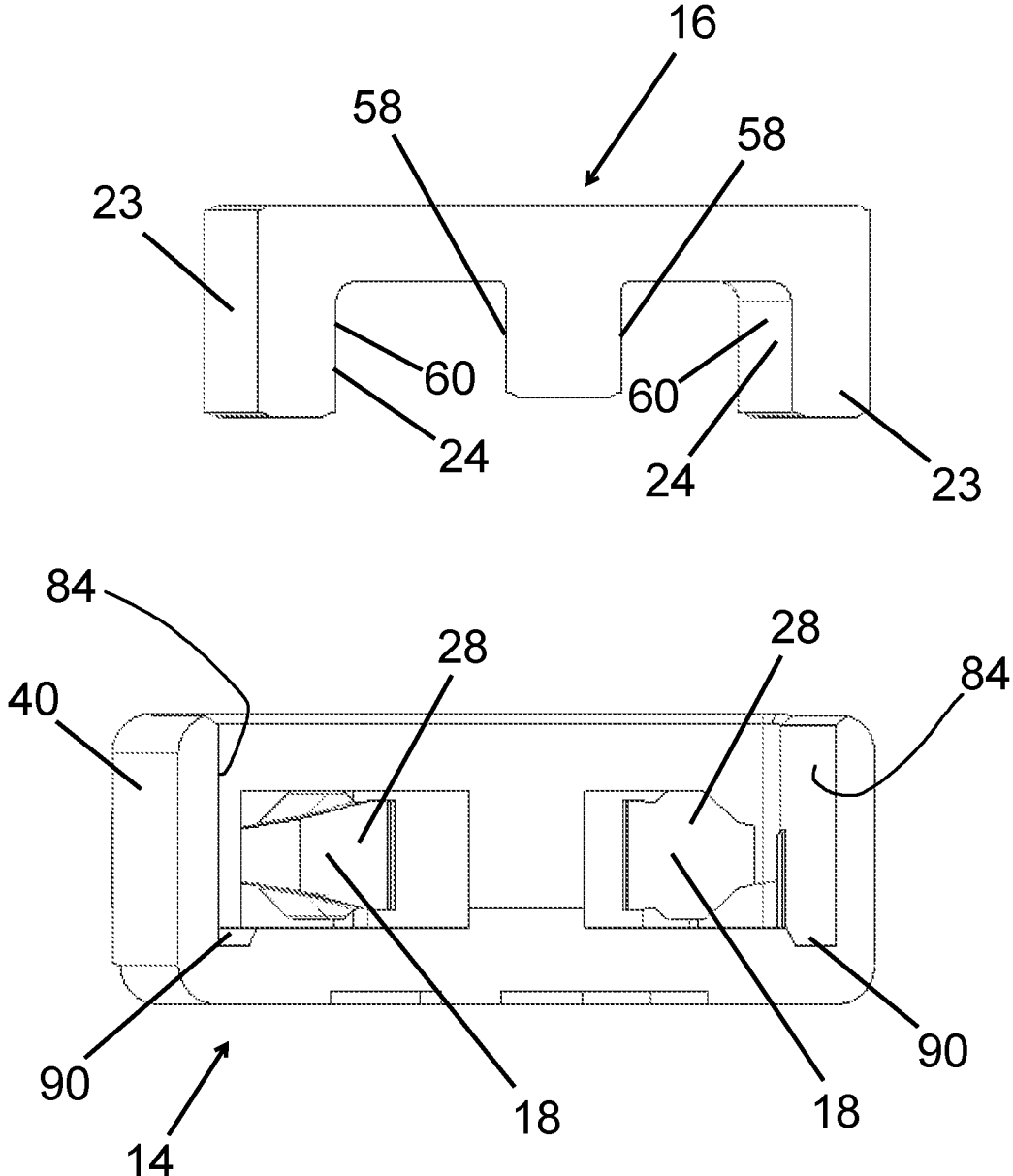
FIG. 22 is an exploded sectional of view of the components of the modified clamping device as shown in FIG. 21.
Figure 23:
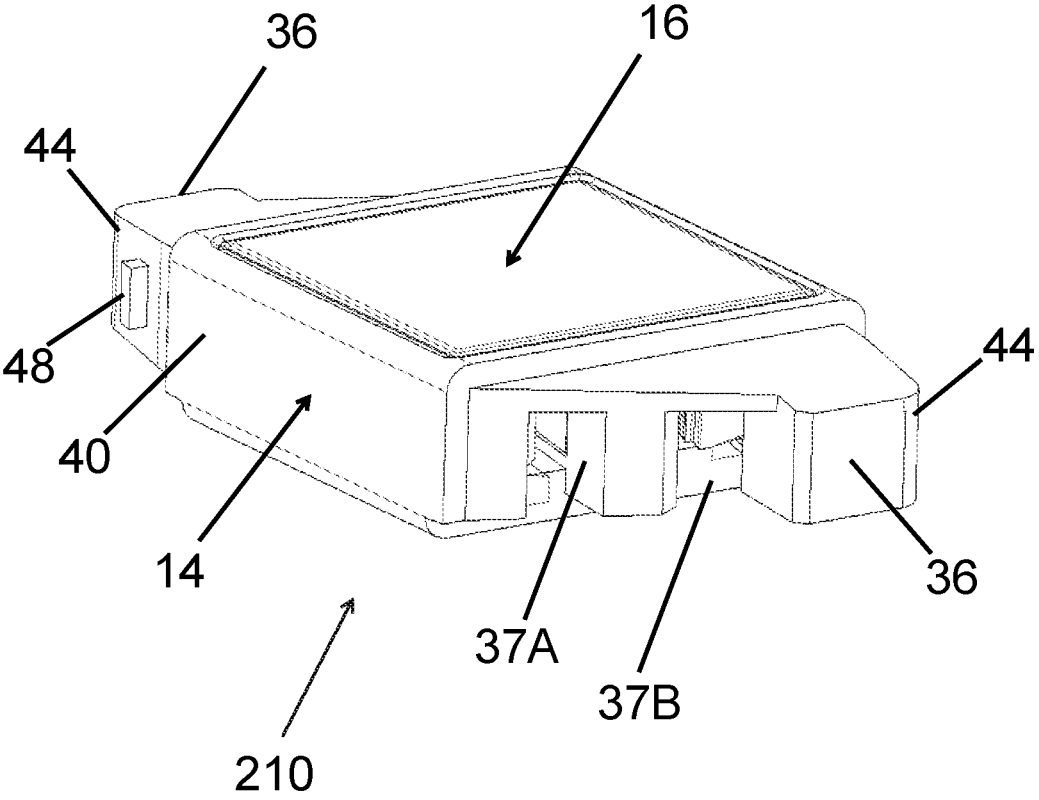
FIG. 23 is an assembled perspective view of the components of the modified clamping device shown in FIGS. 21 and 22.

The body 14 has opposite end regions 36, and the passages 26 extend between said opposite end regions 36. Each end region 36 of the body 14 defines two pairs of opposite entrance and exit apertures 37A, 37B to provide access for two elongate articles 12 to the passages 26. The entrance and exit apertures 37A, 37B are not visible in FIGS. 1 to 9, but see FIGS. 20, 21 and 23. The two elongate articles 12 may be two separate elongate articles 12 or two passes of the same elongate article 12.

The body 14 comprises a central part 40 and two end cap portions 42. The compartment 20 is defined by the central part 40 between the end cap portions 42. The end regions 36 of the body 14 constitute opposite connecting members 44 to connect the central part 40 to the end cap portions 42

Each end cap portion 42 is fastened to the central part 40 at a respective one of the connecting members 44 by means of cooperating fastening formations 46 on the end cap portion 42. The cooperating fastening formations 46 cooperate with corresponding formations 48 on the connecting members 44. The cooperating fastening formations 46 and the corresponding formations 48 are in the form of snap fit formations.

Each end cap portion 42 defines an entrance aperture 38A and an exit aperture 38B for each of the holders 24. The entrance and exit apertures 38A, 38B in the end cap portions 42 are aligned respectively with the corresponding entrance and exit apertures 37A, 37B defined in the end regions 36. The passages 26 defined by the holders 24 extend between the entrance aperture 38A of each end cap portion 42 and the exit aperture 38B of the other of the end cap portions 42.

The holder 24 has opposite openings for each passage 26. The opposite openings are a respective entrance opening 50 at an entrance end 52 of each holder 24, and a respective exit opening 54 at an exit end 56 of each holder 24.

The entrance aperture 38A defined by each of the end cap portions 42 is aligned with the entrance opening 50 of a respective one of the holders 24. The exit aperture 38B defined by each of the end cap portions 42 is aligned with the exit opening 54 of a respective one of the holders 24.

Each holder 24 further includes first and second clamping formations in the form of respective elongate first and second clamping walls 58, 60 defining the respective passages 26. Each of the first and second clamping walls 58, 60 has opposite inner and outer edges, the inner edge of each clamping wall 58, 60 being disposed adjacent the base surface 82 of the compartment 20.

The entrance opening 50 of each passage 26 is adjacent the exit opening 54 of the other passage 26, and the first clamping walls 58 of both of the holders 24 are positioned adjacent each other.

A cover member 69 extends between outer edges of the first and second clamping walls 58, 60 of each of the holders 24, the cover members 69 providing a cover across the compartment 20 when the insert arrangement 16 is received in the compartment 20. A connecting web extends between the inner edges of the first clamping walls 58 of each of the holders 24, thereby connecting the holders 24 to each other.

The first and second clamping walls 58, 60 of each holder 24 converge from the respective exit opening 54 to the entrance opening 50 to provide a narrowing gap between the first and second clamping walls 58, 60. The exit opening 54 of each passage 26 is wider than the entrance opening 50.

The clamping device 10 further includes a respective urging member 68 for each clamping member 18. Each urging member 68 is in the form of a compression spring. It will be appreciated that the urging members 68 could be any other suitable springs.

The urging members 68 are provided to urge the clamping members 18 towards the respective entrance openings 50 of the holders 24, thereby urging the clamping members 18 into clamping engagement with the elongate article 12 in the aforesaid narrowing gap.

The clamping device 10 further includes reaction formations 70 in respective chambers 72. The chambers 72 are part of the connecting members 44 of the central part 40. Each reaction formation 70 constitutes a reaction wall of the respective chamber 72. The end cap portions 42 are mounted over the chambers 72 to be connected to the connecting members 40.

Each urging member 68 extends from the chamber 72 into the respective holder 24 via the exit opening 54. The reaction formations 70 applies reaction forces to the urging members 68 to allow the urging members 68 to urge the clamping members 18 into clamping engagement with the elongate article 12. Thus, each urging member 68 extends from a respective one of the reaction formations 70 to the clamping member 18

Where the insert arrangement 16 has two of the holders 24, the clamping device 10 may have two of the reaction formations 70. The body 14 may comprise both of the reaction formations 70.

The body 14 has two opposite partitions 74 extending across the compartment 20. Each of the partitions 74 defines an entrance hole 78 and an exit hole 80.

The entrance hole 78 defined by each partition 74 is adjacent to, and aligned with, the entrance opening 50 of one of the holders 24. The exit hole 80 defined by each partition 74 is adjacent to, and aligned with, the exit opening 54 of the other of the holders 24.

The elongate article 12 is initially introduced into the passage 26 via the entrance opening 50 and the entrance aperture 38A in the end cap portion 42. The elongate article 12 is pushed out of the passage 26 via the exit opening 54.

When so introduced, the elongate article 12 engages the leading end 30 of the clamping member 18 to push the clamping member 18 against the urging of the urging member 68. The clamping member 18 is pushed out of the way of the elongate article 12 to allow the elongate article 12 to exit through the exit opening 54 and the exit aperture 38B in the end cap portion 42.

When the elongate article 12 has been received through the clamping device 10, the clamping surface 34 of the clamping member 18 engages the elongate article 12.

The elongate article 12 is then pulled in the opposite direction. This has the effect of pulling the clamping member 18 with the elongate article 12 into the narrowing gap between the first and second clamping walls 58, 60, thereby tightly clamping the elongate article 12 and the clamping member 18 between the clamping walls.

FIGS. 1 to 9 show a clamping member 18 in the form of a clamping wedge for use in a clamping device 10, for example the clamping device 10 shown in FIGS. 1 to 9.

The main portion 28 of the clamping member 18 has a height which reduces uniformly from the trailing end 32 to the leading end 30 to form the wedge configuration.

In use, the clamping member 18 is urged into engagement with the elongate article 12 in a direction in which the leading end 30 leads the trailing end 32.

Figure 4:
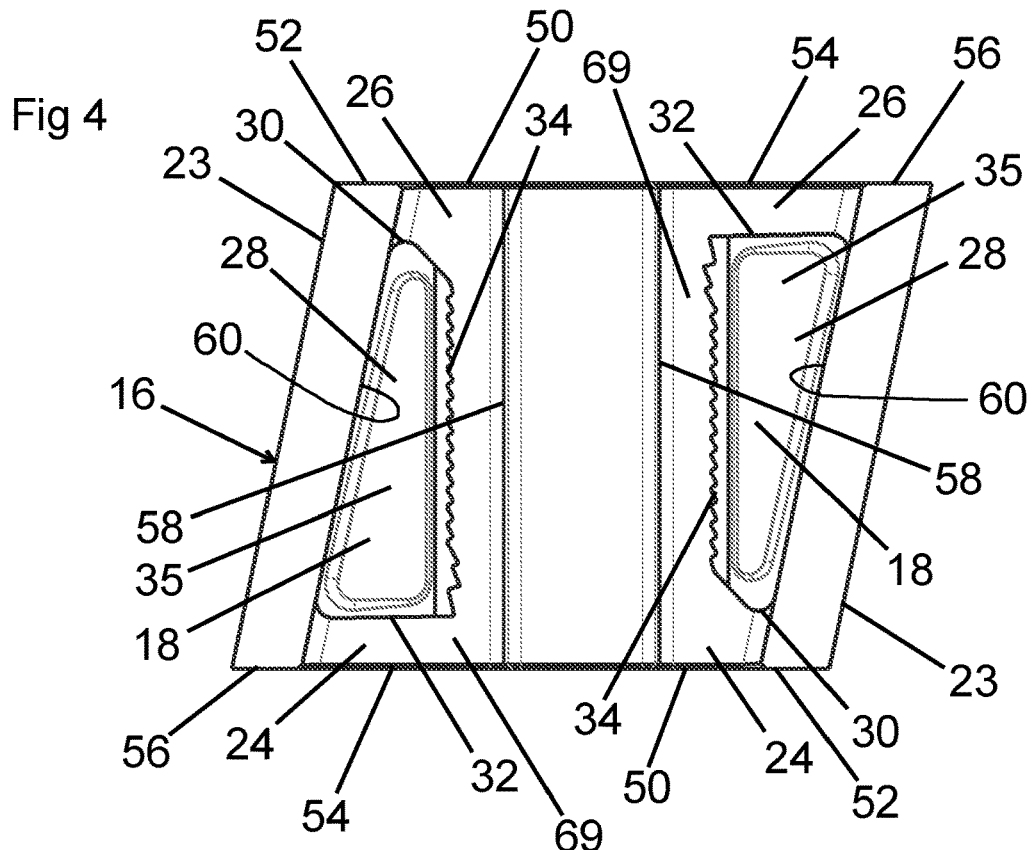
FIG. 4 is a top plan view of the insert arrangement and the clamping members.

The clamping member 18 has a sliding surface 63 for engaging the second clamping wall 60 of the clamping device 10. The sliding surface 63 allows sliding movement of the clamping member 18 along the second clamping wall 60. As shown in FIG. 4, the sliding surface 63 of each clamping member 18 engages, and is slidable along, the second clamping wall 60 of each holder 24.

The sliding surface 63 tapers inwardly from the leading end 30 to the trailing end 32. The inward tapering of the sliding surface 63 is a uniform taper from the trailing end 32 to the leading end 30.

Thus, the sliding surface 63 has a width that reduces along the length of the sliding surface 63 from the trailing end 32 to the leading end 30. The width of the sliding surface 63 at the trailing end 32 of the main body 14 is approximately half the width of the sliding surface 63 at the leading end 30 of the main body 14.

Two protruding side portions 35 extend from respective opposite sides of the main portion 28 of each of the clamping members 18. The side portions 35 are provided between clamping surface 34 and the sliding surface 63.

One of the side portions 35 of each clamping member 18 engages a respective one of the cover members 69 in each of the holders 24. The other side portion 35 engages the base surface 82 of the body 14.

Figure 5:
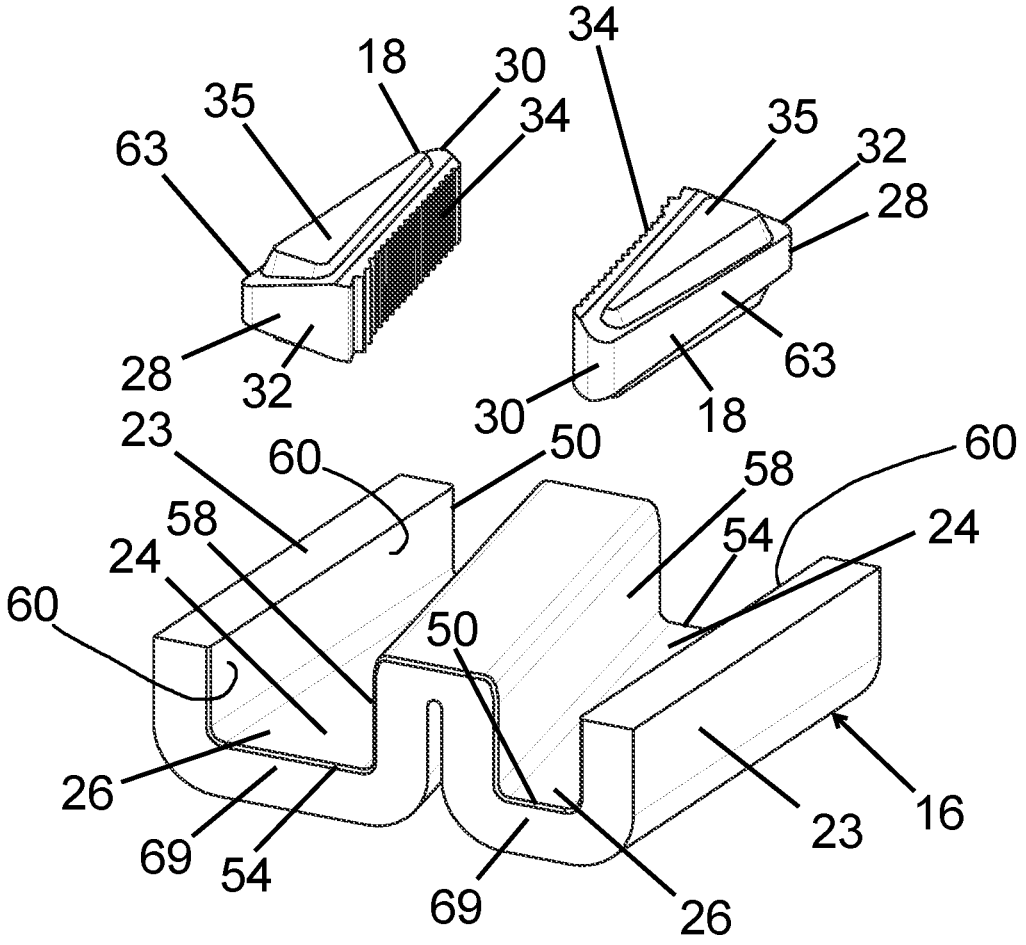
FIG. 5 is an exploded view of the insert arrangement and the clamping members.
Figure 6:
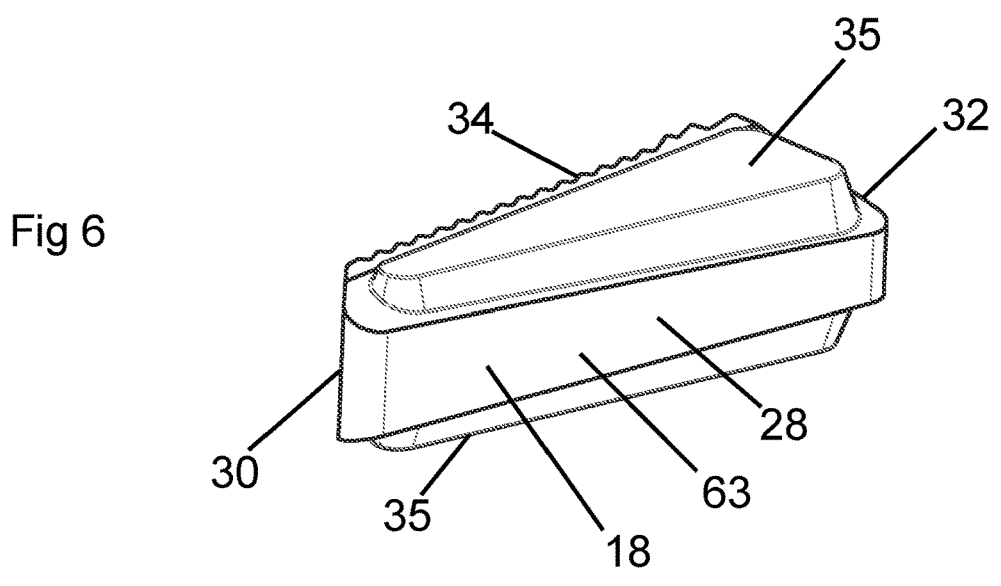
FIG. 6 is a perspective view of one of the clamping members.
Figure 7:
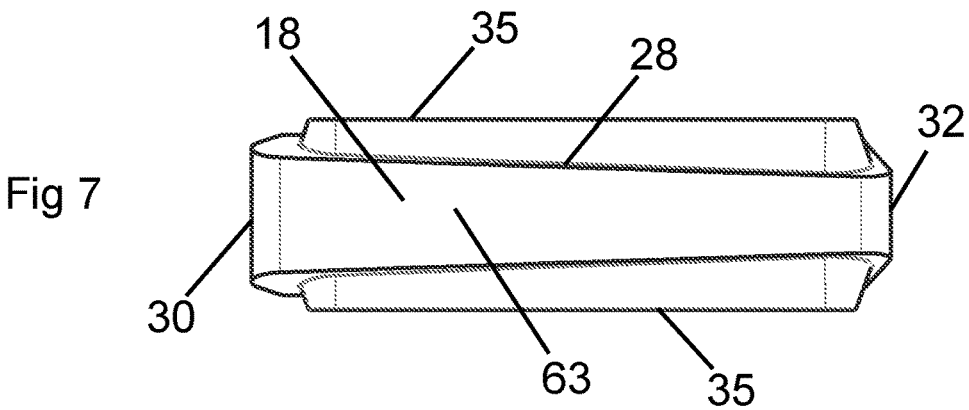
FIG. 7 is a plan view of the clamping member shown in FIG. 6.
Figure 8:
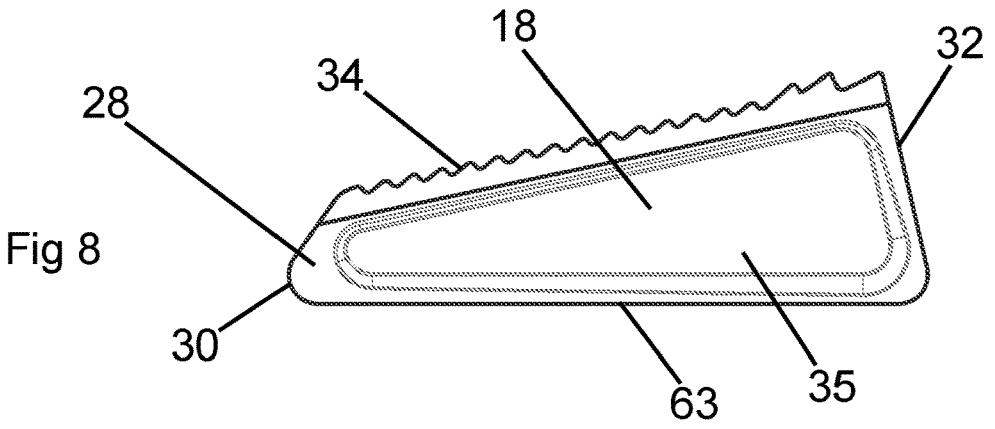
FIG. 8 is side view of the clamping member shown in FIGS. 6 and 7.

FIG. 5 is an exploded view of the insert arrangement 16 and the clamping members 18.

Referring to FIGS. 6 to 9, the clamping surface 34 is provided on the main portion 28 opposite the sliding surface 63. The clamping surface 34 has a width that remains substantially uniform along the length of the main portion 28.

The main portion 28 of the clamping member 18 projects widthways beyond the sliding surface 63 and the clamping surface 34.

The tapering sliding surface 63 of the clamping member 18 reduces surface contact between the second clamping wall 60 and the clamping member 18. When the clamping member 18 clamps the elongate article 12, a load is applied to the clamping member 18. This load is transferred through the clamping member 18 into the insert arrangement 16.

It has been discovered that having a reduced area of engagement between the clamping member 18 and the second clamping wall 60 allows the clamping member 18 to be released more easily than prior art clamping members 18.

In addition, the projecting of the main portion 28 beyond the clamping surface 34 and the sliding surface 63 creates a wide leading end 30 having a large radius and, consequently, a large surface area. This allows the clamping member 18 to slide along the second clamping wall 60 freely so that the clamping member 18 can engage the elongate article 12 tightly and effectively.

The trailing end 32 also has large radius, whereby the large radius on both the leading and trailing end 32 allow the clamping member 18 to slide easily over imperfections in the second clamping wall 60.

Figure 9:
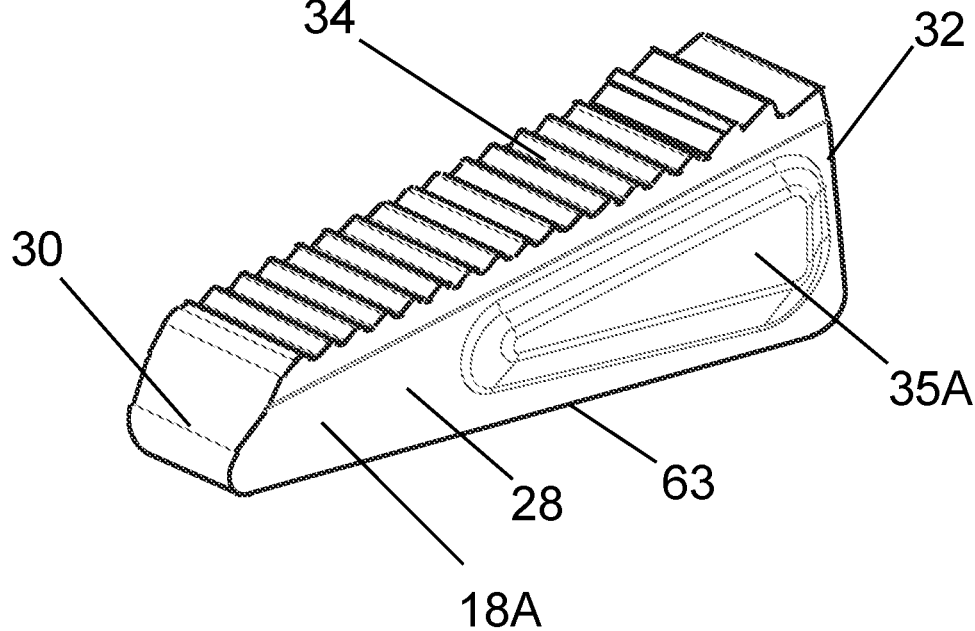
FIG. 9 is a perspective view of an alternative clamping member.
Figures 10, 11:
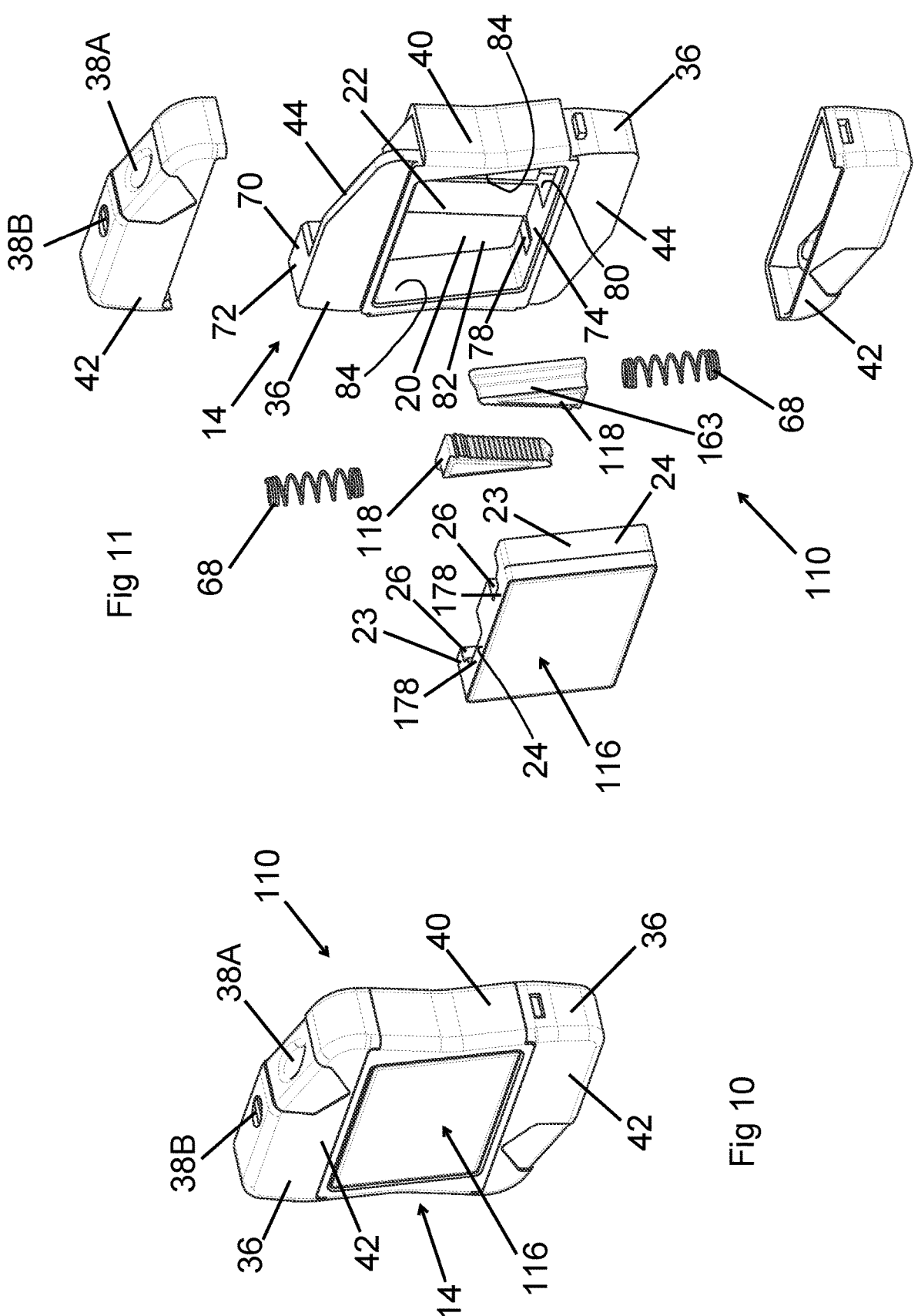
FIG. 10 is a perspective view of a further clamping device.
FIG. 11 is an exploded view of the further clamping device.
Figure 12:
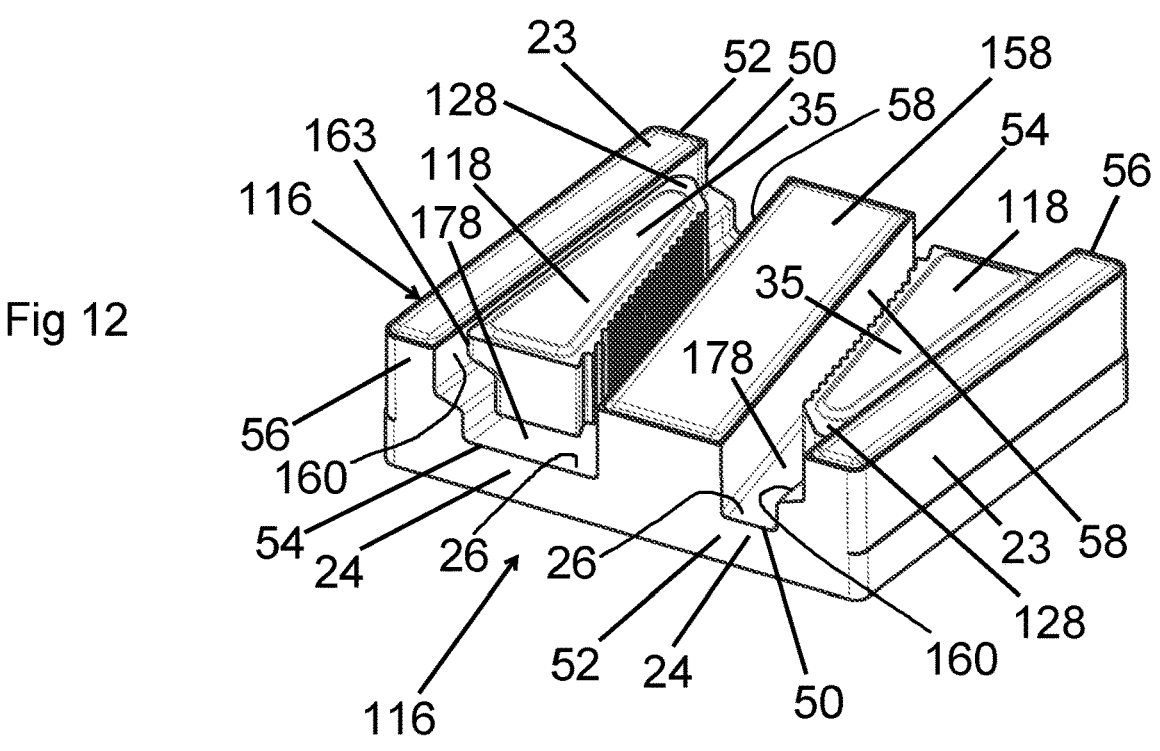
FIG. 12 is a perspective view of a further insert arrangement and further clamping members.
Figure 13:
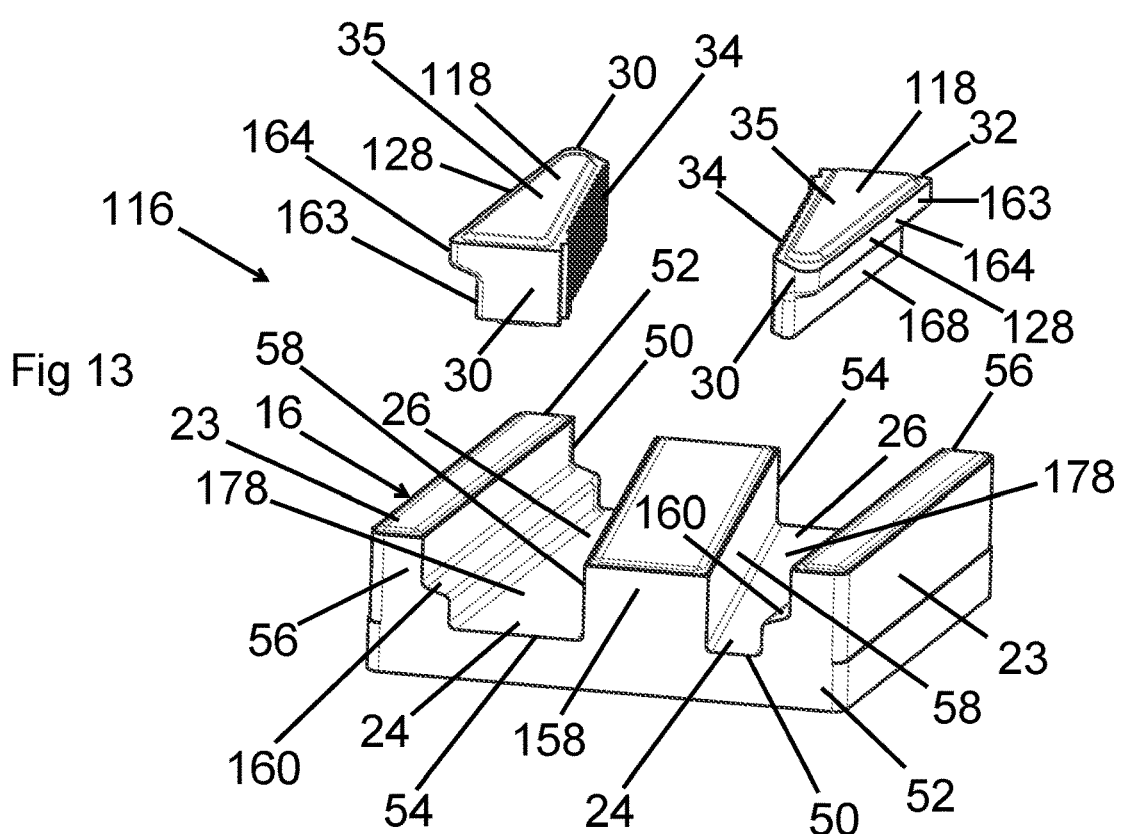
FIG. 13 is an exploded view of the further insert arrangement and the further clamping members.
Figure 14:
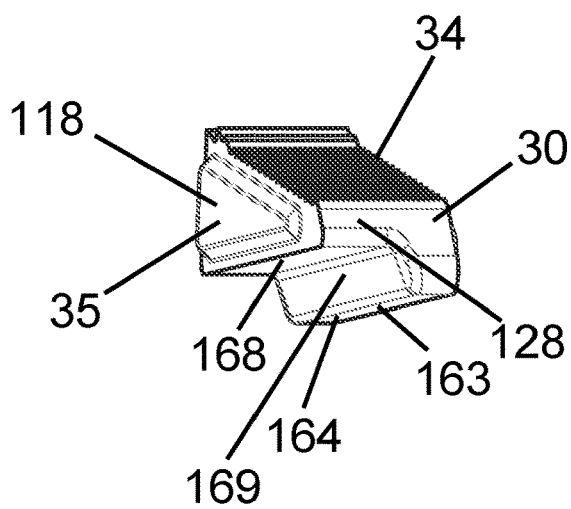
FIG. 14 is a perspective view of one of the further clamping members.
Figure 15:
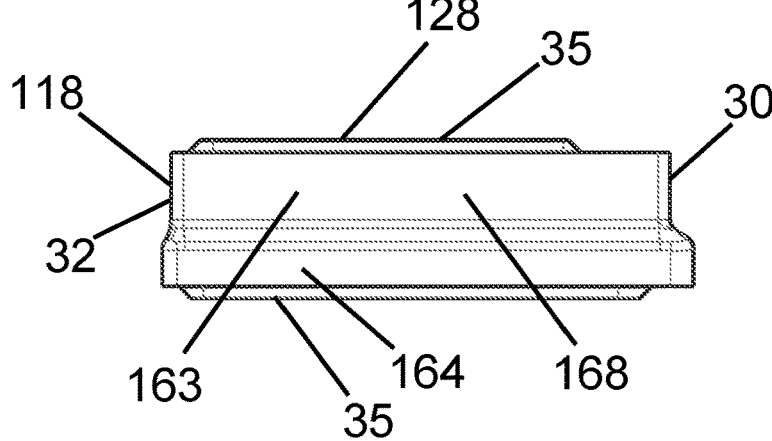
FIG. 15 is a plan view of the further clamping member shown in FIG. 14.
Figure 16:
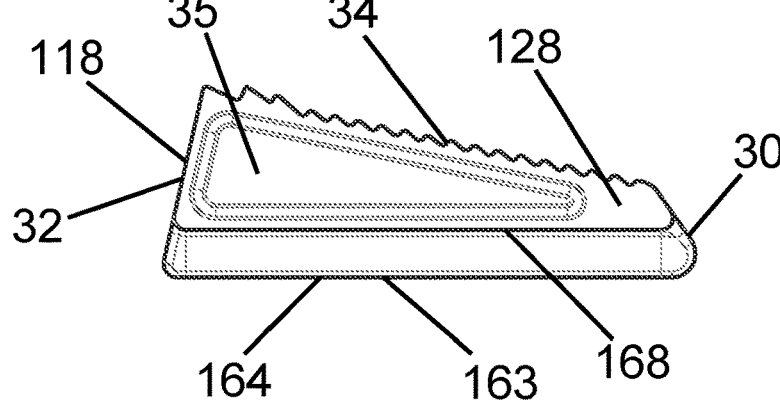
FIG. 16 is side view of the further clamping member shown in FIGS. 14 and 15.

A further version of the clamping member, generally designated 18A, is shown in FIG. 9. The clamping member 18A includes side portions 35A, which are smaller than the side portions 35 of the clamping members 18 shown in FIGS. 1 to 8.

Other than the side portions 35A, the clamping members 18 shown in FIG. 9 are identical to the clamping members 18 shown in FIGS. 1 to 8, and the features of the clamping member 18A have been designated in FIG. 9 with the same reference numerals as the corresponding features of the clamping members 18. The smaller side portions 35A provide an advantage during the manufacturing process.

A further clamping device 110 is shown in FIGS. 10 to 18. The clamping device 110 shown in FIGS. 10 to 18 possesses many of the features of the clamping device 10 shown in FIGS. 1 to 9. These features have been designated in FIGS. 10 to 18 with the same reference numerals as the corresponding features in FIGS. 1 to 9, and function in the same way.

The clamping device 110 shown in FIGS. 10 to 18 comprises a clamping member 118 in the form of a wedge. The clamping member 118 has an elongate main portion 128 with opposite leading and leading and trailing ends 30, 32. An elongate clamping surface 34 and an elongate sliding surface 163 are provided opposite each other on the main portion 128, The clamping surface 34 and the sliding surface 163 extend between the leading and leading and trailing ends 30, 32 and converge towards each other from the trailing end 32 to the leading end 30. Two protruding side portions 135 extend from respective opposite sides of the main portion 128 of each clamping member 118. The side portions 135 are provided between the sliding surface 163 and the clamping surface 34.

The sliding surface 163 extends the length of the main portion 128, and comprises elongate first and second sliding faces extending the length of the sliding surface 163 between the leading and leading and trailing ends 30, 32.

Figure 17:
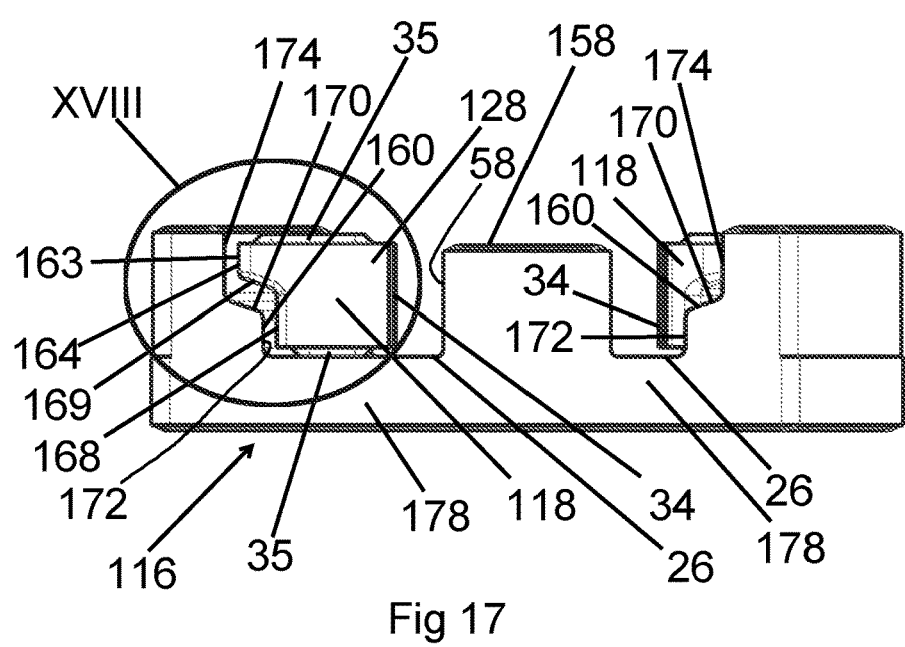
FIG. 17 is an end view of the further insert arrangement and the further clamping members.
Figure 18:
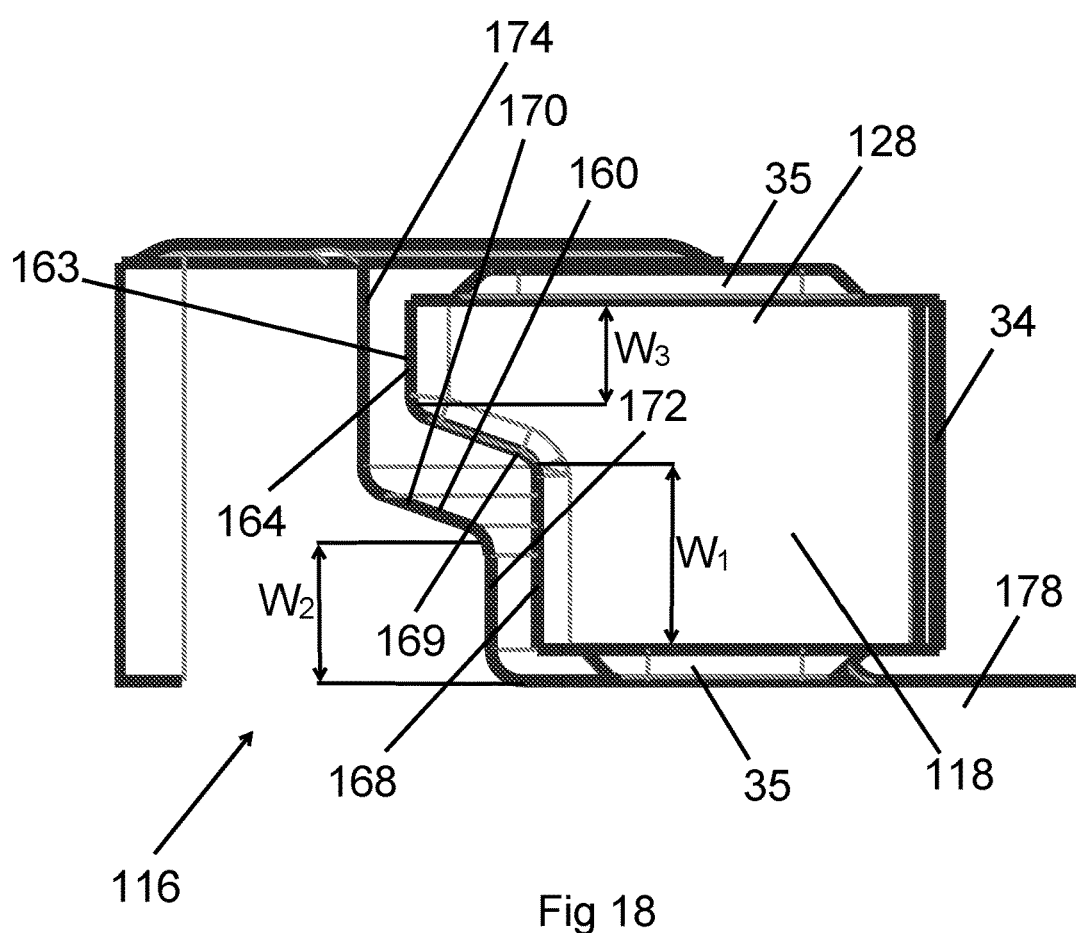
FIG. 18 is a close up view of the region marked XVIII in FIG. 17.
Figure 19:
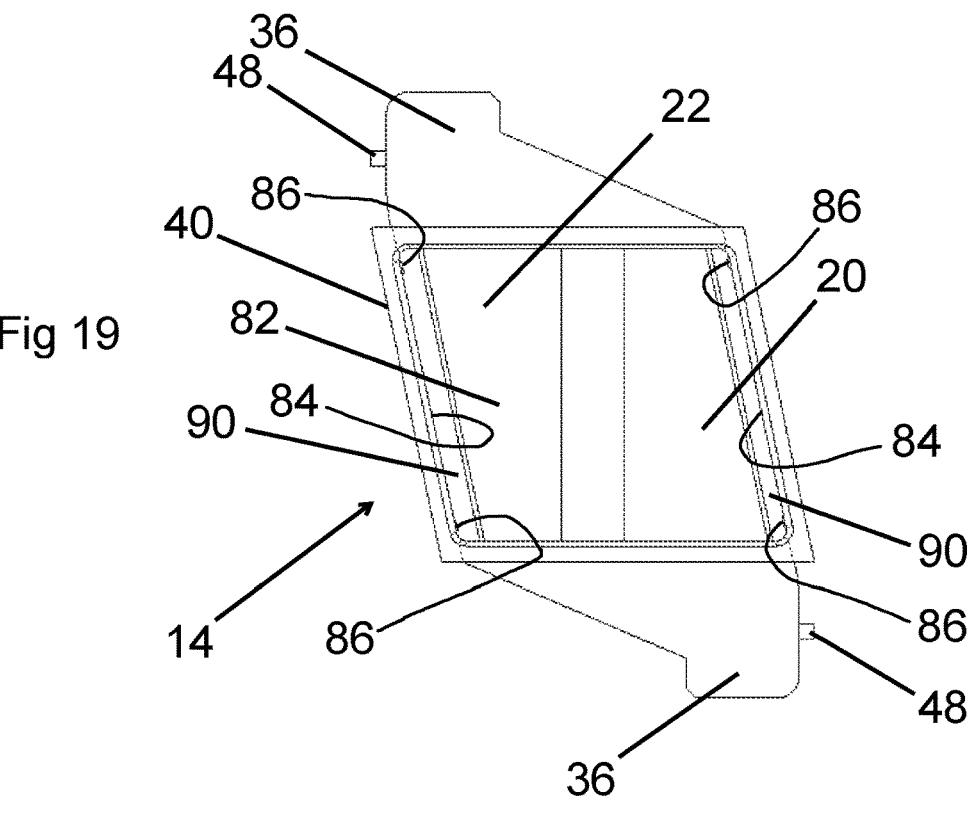
FIG. 19 is a top plan view of a body forming part of a modified version of the clamping device.

Referring to FIGS. 17 and 18, the first sliding face constitutes a projecting sliding face 164 of the sliding surface 163. The second sliding face constitutes a recessed sliding face 168 of the sliding surface 163.

The sliding surface 163 has an elongate step formation 169 also extending the length of the sliding surface 163 between the leading and leading and trailing ends 30, 32. The projecting and recessed sliding faces 164, 168 occupy separate substantially parallel planes, and are spaced from each other by the step formation 169.

The clamping surface 34 is provided with serrations to enhance the grip thereof on the elongate article 12.

The body 14 defines the compartment 20, as described above, and includes an insert arrangement 116 similar to the insert arrangement 16 described above. The insert arrangement 116 comprises the two holders 24. Each holder 24 defines a respective passage 26 along which the elongate articles 12 can extend.

Each holder 24 comprises an elongate first clamping wall 58 and an engaging formation. The engaging formation constitutes the second clamping formation discussed above in connection with the embodiment shown in FIGS. 1 to 9. The second clamping formation is in the form of an elongate second clamping wall 160.

The first and second clamping walls 58, 160 of each holder 24 converge towards each other from the respective exit opening 54 to the entrance opening 50 to provide said narrowing gap between the first and second clamping walls 58, 160.

The convergence of the first and second clamping walls 58, 160 allows the elongate article 12 and the clamping member 118 to be clamped between the first and second clamping walls 58, 160. The second clamping wall 160 has a shoulder formation 170 along which the step formation 169 of the sliding surface 163 extends.

The second clamping wall 160 comprises elongate first and second engaging faces 172, 174 extending the length of the second clamping wall 160. The first engaging face comprises a projecting engaging face 172 of the second clamping wall 160. The second engaging face comprises a recessed engaging face 174 of the second clamping wall 160.

The shoulder formation 170 also extends the length of the second clamping wall 160 between the projecting and recessed engaging faces 172, 174.

The projecting and recessed engaging faces 172, 174 are spaced from each other by the shoulder formations 170. As a result, the projecting and recessed engaging faces 172, 174 occupy separate substantially parallel planes.

In the holder 116, the connecting walls 58 are formed as a single dividing member 158, separating the holders 24 from each other. A cover member 178 extends between outer edges of the first and second clamping walls 58, 160 of each of the holders 24. The cover members 178 and the dividing member 158 provide a cover across the compartment 20 when the insert arrangement 16 is received in the compartment 20.

A respective one of the side portions 135 of each of the clamping members 118 engages the cover member 178 of each of the holders 24. The other side portion 135 engages the base surface 82 of the body 14.

When the clamping members 118 are received in the respective passages 26 in engagement with the elongate article 12, the sliding surface 163 of each clamping member 118 cooperates with the respective second clamping wall 160.

In this position, the step formation 169 of the sliding surface 163 extends along the shoulder formation 170 of the second clamping wall 160, and the projecting sliding face 164 of the sliding surface 163 engages the recessed engaging face 174 of the second clamping wall 160. In addition, the recessed sliding face 168 of the sliding surface 163 engages the projecting engaging face 172 of the second clamping wall 160.

The recessed sliding face 168 of the sliding surface 163 has a width W1, and the projecting engaging face 172 of the second clamping wall 160 has a width W2. In the embodiment shown, the width W1 is greater than the width W2. As a result, the step formation 169 of the sliding surface 163 does not engage the shoulder formation 170 of the second clamping wall 160. The projecting sliding face 164 has a width W3.

The step formation 169 and the shoulder formation 170 are dimensioned so that the recessed sliding face 168 and the projecting engaging face 172 engage each other, and so that the projecting sliding face 164 and the recessed engaging face 174 also engage each other.

However, because the step formation 169 and the shoulder formation 170 do not engage each other, the surface area of the sliding surface 163 engaging the second clamping wall 160 is less than if the sliding surface 163 and the second clamping wall 160 did not possess the step formation 169 and the shoulder formation 170. The effect of this is to reduce the effort needed to release the clamping member 118 when the clamping member 118 has engaged the elongate article 12.

If desired, any one or more of the widths W1, W2 and W3 can be altered to alter the extent to which the sliding surface 163 engages the second clamping wall 160, thereby altering the friction between the sliding surface 163 and the clamping wall 160, so that the sliding force of the clamping member 118 along the second clamping wall 160, and the force required to release the clamping member 118, are also altered.

As discussed above, the clamping device 110 includes the insert arrangement 116, in which the first and second clamping walls 58, 160 are formations of the insert arrangement 116. However, an alternative clamping device 110 may not include the insert arrangement 116. In this alternative clamping device 110, the first and second clamping walls 58, 160 may be part of the body 14 of the clamping device 110.

The first and second sliding surfaces 163 having the step formation 169 between the projecting and recessed sliding faces 164, 168 has the effect of reducing the surface area in contact between the wedge and the second clamping wall 160. This helps to reduce the effort needed to release the clamping member 118 when the clamping member 118 engages the elongate article 12.

The projecting portions of the sliding surface 163 and the second clamping wall 160 provide a stable platform allowing the clamping member 118 to move easily along the second clamping wall 160. The width of the projecting portion can be selected to achieve the desired release force.

Various modifications can be made without departing from the scope of the invention. For example, the sliding surface 63 of the clamping member 18 or 18A may taper inwardly from the trailing end 32 to the leading end 30. This tapering of the sliding surface 63 may be a uniform taper.

Components of a modified clamping device, generally designated 210, are shown in FIGS. 19 to 24. The clamping device 210 comprises all the features of the clamping device 10 shown in FIGS. 1 to 9. These features have been designated in FIGS. 19 to 24 with the same reference numerals as the corresponding features shown in FIGS. 1 to 9.

In addition to the features of the clamping device 10, the clamping device 210 comprises a plurality of the securing members in the form of crush ribs 86. The crush ribs 86 are provided on opposite edge surfaces 84 of the compartment 20. Each crush rib 86 extend across the edge surfaces 86 to the base surface 82.

The crush ribs 86 secure the insert arrangement 16 within the compartment 20 of the body 14. The manufacturing process for the body 14 and the insert arrangement 16 has tolerances, which means that the tightness of the insert arrangement 16 within the body 14 can vary from clamping device to clamping device. Thus, the crush ribs 86 are provided to ensure there is always a tight fit between the insert arrangement 16 and the body 14.

The effect of these tolerances is that some of the material forming the crush ribs 86 is shaved off when the insert arrangement 16 engages the crush ribs 86 as the insert arrangement 16 is inserted into the compartment 20.

There is a risk that some of this material may be displaced onto the clamping members 18, between the clamping members 18, the first and second clamping walls 58, 60 and the elongate article 12, thereby impairing the operation of the clamping device 10.

In order to prevent the shaved material impairing the clamping of the clamping elongate article 12, collecting channels 90 are defined between the base surface 82 and the edge surfaces 84.

Figure 24:
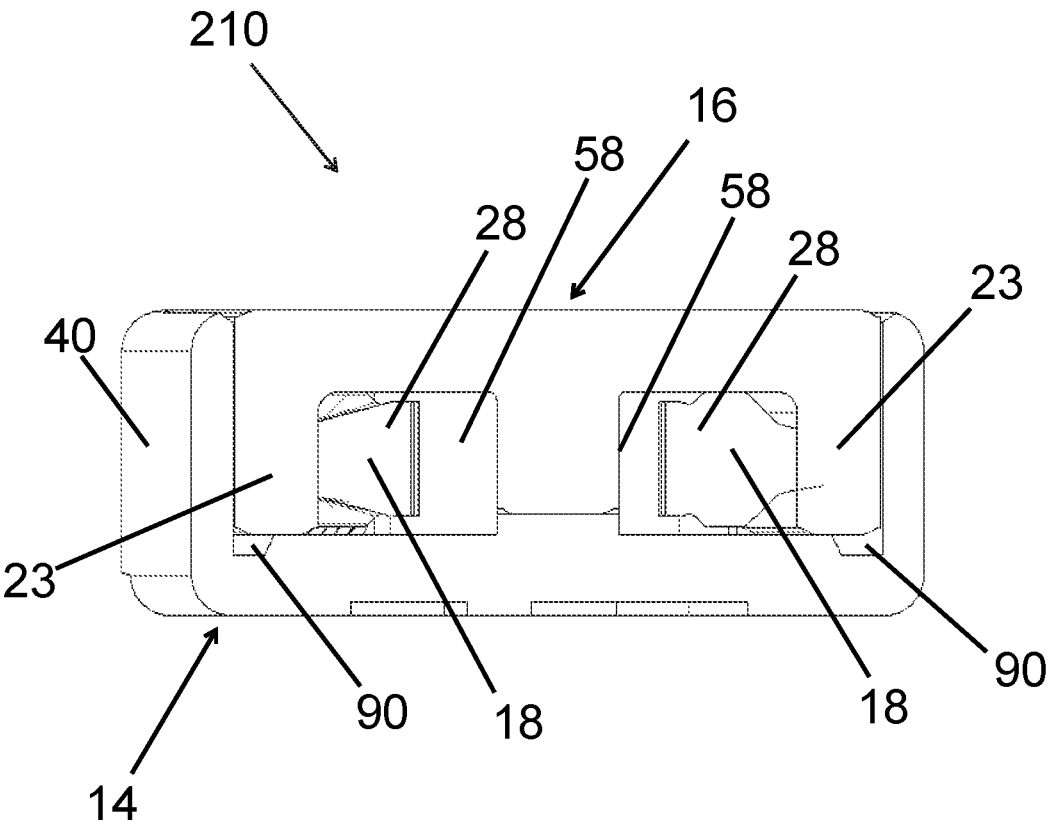
FIG. 24 is an assembled sectional end view of the components of the modified clamping device.

Referring to FIG. 24, when the insert arrangement 16 is received in the space 22, the outer walls 23 of the insert arrangement 16 are disposed over the collecting channels 90, thereby preventing any shaved material in the channels 90 from being displaced therefrom. Thus, the outer walls 23 seal the material shaved off the crush ribs 86 within the collecting channels 90, and prevent said material from impairing the function of the clamping device 10.

The insert arrangements 10, 110, 210 are press fits into the compartments 20, and include the first and second clamping walls 58, 60, 160 against which the clamping members 18, 118 clamp the elongate articles 12 in the passages 26. Thus, the insert arrangements 16, 116 can be formed of a fire resistant material, and the body 20 and other components can be formed of a less expensive material. In the event of a fire, the elongate articles 12 remain clamped within the insert arrangements 16, 116, even if the body 20 and other components are destroyed.

In an alternative embodiment, a part having features of the insert arrangement 16, 116 is overmoulded by the body 14 during manufacture. The overmoulded part may include the holder 24 or holders 24. The part may include the outer walls 23. The overmoulded part may include the cover members 69. The part may include the connecting portion. The overmoulded part may have substantially the same geometry as the insert arrangement 16, 116.

The invention claimed is:

1. A clamping device comprising: a body defining opposite apertures to allow an elongate article to extend through the body, the body defining a space between the apertures; a clamping member for clamping the elongate article; and an insert arrangement or overmoulded part received in the space; the insert arrangement or overmoulded part comprising a holder defining a passage along which the elongate article can extend; wherein the holder includes a clamping formation, the clamping member clamping the elongate article against the clamping formation in use, and wherein the insert arrangement or overmoulded part is formed of a different material than the body.

2. The clamping device of claim 1, wherein the clamping member comprises: an elongate main portion having opposite ends; a clamping surface on the main portion; and a sliding surface on the main portion.

3. The clamping device of claim 2, wherein the clamping surface is serrated.

4. The clamping device of claim 1, wherein the insert arrangement or overmoulded part has outer walls, and wherein the holder is defined between the outer walls.

5. The clamping device of claim 1, wherein the clamping formation constitutes a first clamping wall, and wherein the holder further comprises a second clamping wall for applying a clamping force to the clamping member, to clamp the clamping member and the elongate article between the first and second clamping walls.

6. The clamping device of claim 5, wherein the holder comprises a cover member to provide a cover across the space defined by the body, wherein the cover member extends between the first and second clamping walls.

7. The clamping device of claim 5, wherein the first and second clamping walls converge towards each other, and wherein the first and second clamping walls provide a narrowing gap between the first and second clamping walls.

8. The clamping device of claim 1, comprising a spring for urging the clamping member into clamping engagement with the elongate article.

9. The clamping device of claim 8, wherein the body comprises a reaction wall for applying a reaction force to the urging member.

10. The clamping device of claim 1, wherein the passage has an entrance end through which the elongate article enters the passage when the elongate article is introduced into the passage, wherein the passage has an exit end through which the elongate article exits the passage after the elongate article has been introduced into the passage, wherein the holder defines opposite openings for the passage through which the elongate article can extend, wherein one of the opposite openings is an entrance opening at the entrance end of the passage, and wherein the other of the opposite openings is an exit opening at the exit end of the passage.

11. The clamping device of claim 10, wherein the body includes a chamber at an end of the body, wherein a spring extends from the chamber into the holder via the exit opening, wherein the spring is for urging the clamping member into clamping engagement with the elongate article.

12. The clamping device of claim 10, wherein the body comprises opposite partitions extending across the space defined between the opposite apertures, wherein one of the partitions defines an entrance hole aligned with the entrance opening of the holder, and wherein the other of the partitions defines an exit hole aligned with the exit opening of the holder.

13. The clamping device of claim 1, wherein the insert arrangement or overmoulded part is formed of a more fire-resistant material than the body.

14. The clamping device of claim 1, wherein the insert arrangement or overmoulded part is formed of stainless steel, and/or the clamping member is formed of a ceramic material, and/or the body is formed of zinc or a plastics material.

15. The clamping device of claim 1, wherein the insert arrangement or overmoulded part comprises two of the holders, wherein the clamping device comprises two of the clamping members, and wherein a respective one of the clamping members is provided for each of the holders.

16. The clamping device of claim 15, wherein each of the holders defines a respective passage.

17. The clamping device of claim 16, wherein the insert arrangement or overmoulded part has opposite ends, wherein the entrance end of each of the passages is at the opposite end of the insert arrangement or overmoulded part to the entrance end of the other of the passages.

18. The clamping device of claim 15, wherein the insert arrangement or overmoulded part comprises a connecting portion to connect the holders to each other.

19. A clamping device comprising: a body defining opposite apertures to allow an elongate article to extend through the body, the body defining a space between the apertures; a clamping member for clamping the elongate article; and an insert arrangement or overmoulded part received in the space; the insert arrangement or overmoulded part comprising a holder defining a passage along which the elongate article can extend; wherein the holder includes a clamping formation, the clamping member clamping the elongate article against the clamping formation in use, wherein the clamping member comprises: an elongate main portion having opposite ends; a clamping surface on the main portion; and a sliding surface on the main portion.

20. A clamping device comprising: a body defining opposite apertures to allow an elongate article to extend through the body, the body defining a space between the apertures; a clamping member for clamping the elongate article; and an insert arrangement or overmoulded part received in the space; the insert arrangement or overmoulded part comprising a holder defining a passage along which the elongate article can extend; wherein the holder includes a clamping formation, the clamping member clamping the elongate article against the clamping formation in use, wherein the passage has an entrance end through which the elongate article enters the passage when the elongate article is introduced into the passage, wherein the passage has an exit end through which the elongate article exits the passage after the elongate article has been introduced into the passage, wherein the holder defines opposite openings for the passage through which the elongate article can extend, wherein one of the opposite openings is an entrance opening at the entrance end of the passage, and wherein the other of the opposite openings is an exit opening at the exit end of the passage, wherein the body includes a chamber at an end of the body, wherein a spring extends from the chamber into the holder via the exit opening, wherein the spring is for urging the clamping member into clamping engagement with the elongate article.

* * * * *